INVENTORS
ROLAND A. MORCK
MEADE C. HARRIS
BY DAVID W. MILLER

Herbert J. Evers
ATTORNEY

INVENTORS
ROLAND A. MORCK
MEADE C. HARRIS
DAVID W. MILLER
BY
ATTORNEY

Nov. 24, 1964       R. A. MORCK ETAL       3,158,486
PREPARATION OF BAKED FOOD PRODUCTS
Filed Oct. 10, 1960                6 Sheets-Sheet 4

INVENTORS
ROLAND A. MORCK
MEADE C. HARRIS
BY    DAVID W. MILLER

Herbert J. Evers
ATTORNEY

INVENTORS
ROLAND A. MORCK
MEADE C. HARRIS
BY  DAVID W. MILLER

Herbert J. Evers
ATTORNEY

United States Patent Office 3,158,486
Patented Nov. 24, 1964

3,158,486
PREPARATION OF BAKED FOOD PRODUCTS
Roland A. Morck, Glen Rock, Meade C. Harris, Rutherford, and David W. Miller, Fair Lawn, N.J., assignors to National Biscuit Company, a corporation of New Jersey
Filed Oct. 10, 1960, Ser. No. 61,466
5 Claims. (Cl. 99—86)

This invention relates to improvements in the art of baking, and more particularly relates to novel baking mixtures and baked food products, and novel means for preparing such baking mixtures and food products.

In the description that follows, the present invention will be described in connection with the production of baked cookies. It is to be understood, however, that the invention is intended to apply generally to the production of baked goods such as biscuits, cookies, crackers and the like, and the materials that appertain to the various stages in the production of such baked goods, as well as to the production of other foods such as breads, cereals and animal foods.

For convenience, the invention will be described in connection with the production of cookies, but it is to be understood that it is intended that the term cookies as used herein refers generically to the broad class of baked goods such as biscuits, cookies, crackers and the like and that the use of such term is not intended to be restrictive in any way.

In the present practice of producing cookies, generally a cream mass is formed by mixing sugar, shortening, and water in the proper proportions. Other ingredients may be added to the cream mass, such as nutritional, flavoring or leavening agents. The cream mass is then mixed with flour in an amount sufficient to make a dough of the proper consistency. Thereafter, the dough is either sheeted and cut into cookie forms or formed in a rotary machine. If the dough is soft enough it can be put into a wire cut machine to provide measured globules of dough. The dough is then suitably baked to form the desired finished cookie product.

For years the above outlined procedure has been generally followed by those skilled in the art without significant changes. Such innovations or modifications that were adopted were usually occasioned by either the development of improved ingredients which permitted greater latitude in the selection of materials or process conditions, or the use of improved equipment which more reliably controlled the process conditions. For the most part, however, the present process for producing cookies functions in approximately the same manner as it did years ago. That is to say, it is still considered necessary to perform certain steps, such as forming a cream mass, mixing flour to form a proper dough, and depositing the dough in suitably sheeted or shaped form onto a baking surface.

It is therefore an important object of the present invention to provide a novel method of producing cookies from which unusual and new varieties of cookies and other baked goods may emerge.

Another object of the present invention is to provide an improved cookie product having an attractive granular surface appearance which is of a character entirely dissimilar to normal cookies.

Another object is to provide an improved method of producing baked goods, such as cookies, wherein the cookie ingredients may be disposed in the cookie mix, prior to baking, in any desired arrangement or pattern.

Yet another object is to provide a new starting material for baked cookies comprising a granular cookie dough material.

Still another object of the invention is to provide an improved dough mixture comrising a new cookie dough in granular form and in admixture with suitable cookie ingredients, either in loose form or in suitably bonded compacted form, which can be stored under refrigeration until ready for use.

Other objects, features and advantages of the present invention will be apparent from the following detailed description of certain preferred embodiments thereof, taken in conjunction with the drawings in which.

The objects of the present invention are accomplished by forming a cream mass comprising at least the basic cookie components, such as sugar, shortening and water, incorporating the cream mass in flour in such proportions as to form a dry dough, comminuting the dry dough into loose, non-adherent pellets or granules, depositing the dough granules, either alone or in admixture with other cookie ingredients, on a suitable support or belt, treating such deposit with a water solution or other suitable liquid, such as edible fats or oils, baking the so-treated deposit for a suitable period, and separating the baked product into individual cookies. This sequence of steps is preferably performed all in one continuous operation, although various subcombinations of the above steps may be separately performed if so desired.

According to the invention a novel cookie product is produced by adding only a portion of water and/or other suitable liquid that is normally required in the dough forming step, and later supplementing the moisture content of the dry granular dough in the liquid treating step. In this manner, the dry dough mass possesses the requisite consistency to be granulated into the desired particulate form, and later, if necessary, can be suitably treated with water or other compatible fluids to supply the necessary fluid balance to bring the dough into proper condition for baking.

The liquid to be used in the formulation of the dry dough of the invention may comprise water which has been previously saturated with sugar and other minor ingredients, and mixed with shortening to form an emulsion—or cream mass. Ingredients or additives, other than the basic dough ingredients, may of course be incorporated in the cream mass, the particular ingredients depending upon the final formulation that is desired. Such additives may comprise one or more of the usual leavening agents, nutritional agents, and/or flavoring additives.

As a feature of the invention, the cream mass is utilized in admixture with flour in such proportions as to attain a dry dough mixture which is amenable to subsequent dough treatment steps in preparation of baking. Although up to this point the process for making the dry dough appears to bear some resemblance to the manufacture of a conventional dough, one major difference in formulation is present.

For example, in a conventional dough containing 100 parts flour, 35 parts sugar, and 15 parts shortening, at least about 13 parts of water are needed if the dough is to be processed with a rotary cutter. Slightly more water is needed for a sheeted dough using a reciprocating cutter. In contrast, in the present invention approximately 10 parts of water are required.

In order to appreciate the significance of the low moisture content in the dough of the present invention, it should be realized up to now the art has consistently shied away from the use of dry dough principally because of its behavior characteristics. A very slight reduction in the moisture content of a conventional dough has a disproportionate effect on the consistency of the dough. The reduced moisture dough tends to be crumbly and requires excessive pressure in order to remain adherent. Consequently, in conventional doughs there is relatively little flexibility in the water content.

It would seem, therefore, that a reduction in the moisture content of a dough would be a thing to be avoided. However, our investigations have been shown that satisfactory water contents can be achieved at levels substantially below that heretofore considered to be the minimum acceptable level without incurring crumble and non-adherent characteristics, provided the dry dough is utilized in granulated form, rather than in the conventional rotary cutter or sheet form.

The term "dry" or "low moisture" as used herein is intended ot apply to a dough having a moisture content not substantially greater than ¾ of the moisture content required for the conventional processing of a dough with approximately the same ingredients.

It will be realized that the low moisture conditions involved in production of the dry cookie dough of the invention will vary, but generally the dough mixing step is carried out using 7 to 17 parts water for each 100 parts of flour, desirably 7.5 to 15 parts water, and preferably 8 to 11 parts water.

The amount of shortening to be used in the dry dough product of the invention can be varied considerably. In general, less shortening is required in the dough as the moisture content is increased. In fact, at water levels above about 13 parts per 100 parts of flour, the exclusion of the shortening ingredient will still produce a satisfactory dough. Surprisingly, in the present invention, the complete absence of shortening results in a product of unusual taste and texture. This is considered to be a major technological breakthrough in the industry. Bakers cannot turn out a conventional cookie with a conventional dough without including at least a minimum amount of shortening. Thus the shortening content in the dough of the present invention is generally 0–25 parts per 100 parts flour, with 5–21 parts being desirable, and 12–18 parts being preferred.

The amount of sugar in the dry dough of the invention is generally in the amount between 17 and 70 parts for each 100 parts flour, desirably 22 to 60 parts, and preferably 25 to 45 parts.

Preferably, the proportions of dough ingredients are suitably varied so that a dry type of dough is formed. This type of dough is admirably suited for handling in apparatus for comminuting the dough.

After the dough has been mixed it is comminuted by suitable means, such as a conventional comminuting machine having a comminuting chamber provided with cutter blades mounted on a rotating shaft where the dough is diced, granulated, pelletized or otherwise reduced in size. The resulting dough is a mass of discrete globules, granules, pellets or particles, which is dry and loose and in which the individual particles do not mass, lump or stick together, unless compressed. The dough granules may be suitably screened to provide a desirable fraction.

This loose mass of dough granules constitutes a new and useful composition as a starting material in the production of cookies made in accordance with the practice of the invention. It is particularly suitable for storage under refrigeration, similar to frozen foods, until such time as it is needed. Preferably, the unbaked loose mixture of dough granules and cookie ingredients is deposited on a band or tray to form a substantially uniform bed depth, which during baking becomes fused to form a baked sheet. Thereafter, the baked sheet can be suitably cut to provide cookies of various shapes and sizes.

It is to be understood that the present invention embraces the addition or substitution in the aforesaid prepared loose, dry dough granules or loose mixtures comprising dry dough granules, of additives, high energy ingredients, binder materials and other constituents to serve different requirements without significantly influencing the properties of the basic dough. For example, the basic dough composition of the invention may be used in combination with yeast in the making of bread, or in combination with meat, tomato pumice, and meat meal in the making of dog food. Different formulations can also be processed with essentially the same equipment and technique.

Examples of additives that may be utilized in the granular cookie composition of the invention are nuts, seeds, candied fruits, dried fruits, fruits, candies, gum drops, peels; in fact almost anything that would impart beneficial characteristics to the baked cookie, be it texture, flavor, color, tenderness, appearance, etc.

It is desirable in the practice of the present invention that the granules of unbaked cookie granules be generally of the same particle size as the additives. However, considerable latitude in the variation of particle sizes is permitted since as a practical matter the presence of indiscriminate particles of either larger or smaller size will have little effect, if any, on the overall results. Broadly speaking the dough granules should be approximately through 5 and over 24 mesh size, U.S. Series, i.e., capable of passing through a 5 mesh screen and retained on a 24 mesh screen, desirably through 6 and over 16 mesh, and preferably through 7 and over 12 mesh.

It will be realized that the desirable sizes of dough granules can be varied widely, and that the unused fraction of dough granules can be returned and recycled to previous steps such as the dough mixing step or the dough comminution step.

The present invention provides a new concept in the continuous production of cookies in which a cookie formulation comprising dry dough granules is deposited onto a pan, conveyor or oven band, preferably in loose particulate form, to form an unbaked cookie bed, there being little adherence between the various particles comprising the formulation and little densification or compaction thereof. In the preferred mode of practice, the cookie formulation is deposited on a moving oven band. The ingredients constituting the cookie formulation can be premixed prior to deposition on the moving band, or mixed concurrently with deposition on the baking band, or the dough particles can be deposited first and other ingredients layered over it. If desired, the dough particles can be arranged in spaced parallel rows with flavoring and/or coloring particles filling the spaces. The thickness of the unbaked cookie bed will depend on the rate of deposition and the relative rate of movement between the cookie particle dispenser and the oven band.

Generally speaking, the cookie dough and cookie ingredients, as the case may be, are separately reduced to the desired granule size beforehand, and mixed together to form a homogeneous mixture. Naturally if the cookie product is to be an all-dough cookie, there is no necessity for admixing other ingredients. Preparation of the grandular cookie mixture may be accomplished in any one of a number of equipments for mixing different materials. In practice, the granular dough and other ingredients may be mixed and simultaneously deposited onto a moving oven band to form a bed or a layer. This can be followed by the deposition thereover of any number of layers of other ingredients or decorating materials, if so desired.

Any suitable apparatus capable of providing a satisfactorily mixed granular dough product may be used, preferably one which recommends itself to mixing the desired cookie ingredients and which is susceptible of application with various types of additives and is adapted to various adjustments.

Thereafter, as a feature of the invention the bed of cookie material may be either baked or preferably liquid treated prior to baking as by water spraying or by sprinkling the unbaked cookie bed with an edible fat or oil. Normally the amount of water used is that which will bring the water level of the dry granules up to that of a normal cookie dough, having approximately the same proportions of ingredients although smaller or larger amounts may be used if so desired. This treatment softens the dough to a certain degree so that upon subsequent baking the particles are fused together and a more tender product is obtained. Thereupon, the thus prepared cookie material is baked in a normal manner to produce the baked cookie sheet. This cookie sheet can then be suitably subdivided into smaller pieces to produce the finished baked goods.

An unusual feature of the present invention is the unique appearance of the baked cookie which combines beauty, look and texture into a single commodity. The particles comprising the baked cookie are surface bonded to adjacent particles to form a unitary mass having an uneven, crumbly, pebble-like surface appearance in which the individual identities of the surface particles are preserved. The individuality of these surface particles makes the composite alive with color and adds the final touch of unusual color, texture and appearance.

Figure 1:
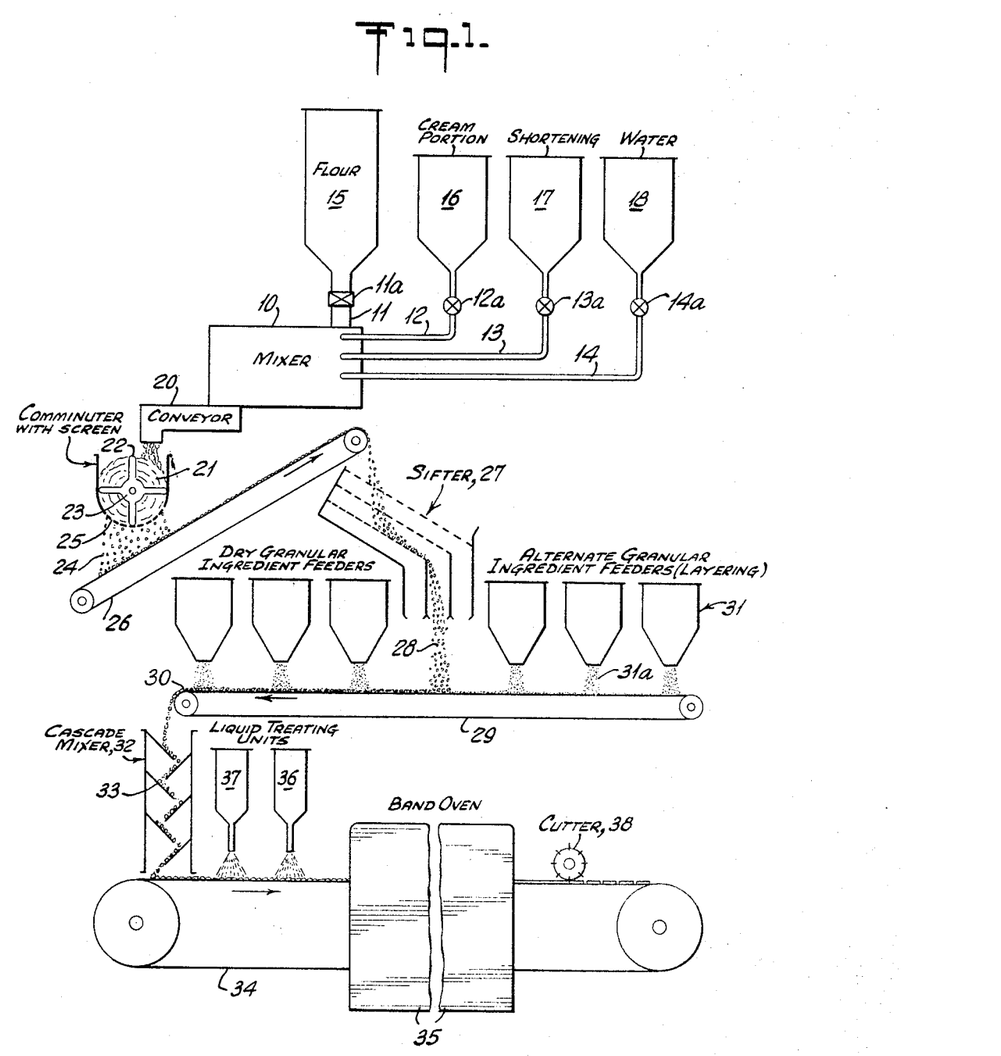
FIG. 1 is a flow sheet illustrating the method and equipment employed in the practice of the present invention.

As illustrated in FIG. 1, an exemplary apparatus to be used in the practice of the invention may comprise a continuous mixing vat or chamber 10 having connected thereto a suitable number of conduits, such as 11, 12, 13 and 14, for the introduction of the basic dry dough ingredients from a flour chamber 15, a cream chamber 16, a shortening chamber 17 and a water chamber 18. The ports 11, 12, 13 and 14 are suitably valved by means of valves, 11a, 12a, 13a and 14a, respectively, in order to facilitate changing the proportions of the basic ingredients and making any desirable adjustments that may be necessary during the course of production. Alternatively, the ingredients of the cream mass may be roughly premixed by introducing measured amounts of the ingredients into the mixing vat 10 in proper proportions to form a dry dough before the flour is introduced.

The dry dough mix is discharged from the end of the mixer 10 in bulk form into a conveyor apparatus 20 by such means as a motor-driven screw or conveyor belt (not shown) into a comminuting chamber 21 where it is comminuted, preferably by means of sharp comminuting blades 22 radially mounted on a suitably rotating shaft 23. Any number and arrangement of bladed shafts 23 may be used, one bladed shaft being shown in the drawing. Where more than one blade shaft is used, such shafts may be arranged parallel to one another, with the blades of one shaft operating in overlapping and interfitting relation with the blades of joining shafts. Comminuted dough granules 24 of a desired size pass through a screen mesh 25 which preferably is in the form of a semi-cylindrical wall constituting the lower wall of the comminuting chamber 21. As illustrated in FIG. 1, the screened dough granules 24 may be deposited on the feed belt 26 of a sifter mechanism 27 which allows comminuted dough granules 28 of a desired size to be deposited on a conveyor belt 29 in the form of a dough granule bed 30. This belt 29 is also adapted to receive at various points along its length other granular dough additives 31a from feeders or hoppers 31 which are spaced along said belt. As illustrated herein, the additives 31a are deposited ahead of the dough granular 28, although other arrangements are equally feasible. Preferably the dough granules 28 and dough additives 31a on the belt 29 are mixed in a cascade mixer 32 having spaced, alternately arranged cascade baffles 33 for automatically mixing the ingredients and dispensing them in such mixed form onto a conveyor belt or band 34 of a band oven 35. However, if desired the granular additives may be deposited as a layer on the dough granule bed 30.

It will be appreciated that although separate conveyors 29 and 34 are illustrated herein, for some purposes it may be feasible to utilize a single conveyor belt. In such case, the cascade mixer 32 may be interposed between the sifter 27 and the conveyor belt 29, and the granular dough additives from hoppers 31 may be fed into the cascade mixer instead of on the conveyor belt. One or more liquid treating units 36, 37 may be provided along the conveyor bolt 34 to furnish, as by sprinkling or spraying, any additional liquids that may be needed. The baked cookie sheet emerging from the oven 35 may be suitably divided by means of a rotary cutter 38 or the like.

The method of the present invention has been successfully applied in a variety of ways to a considerable number of mixtures. The following examples will serve to illustrate the principles and broad applicability of the present invention.

EXAMPLE 1

Figure 2:
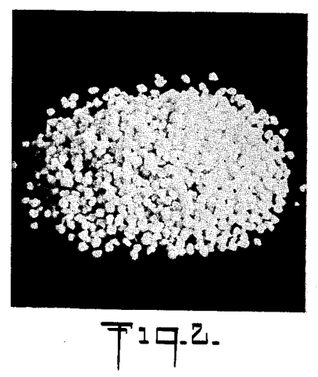
FIG. 2 is a photograph of a loose pile of unbaked cookie dough granules embodying the principles of the present invention, the granules shown being coarse sized granules.

A dough batch is prepared by mixing 100 parts flour with a cream mass consisting of 33 parts sugar, 16 parts shortening, and 9 parts water, until a dry dough of proper consistency for granulating is formed. Comminution of the dough is accomplished in a granulator where the dough is comminuted, and then suitably screened to form a loose mixture of coarse, dry dough granules of through 6 mesh and over 7 mesh (U.S. Series). FIG. 2 is a photograph of a sample of the resulting coarse dough granules comprised of a multiplicity of coarse dough granules.

EXAMPLE 2

Figure 3:
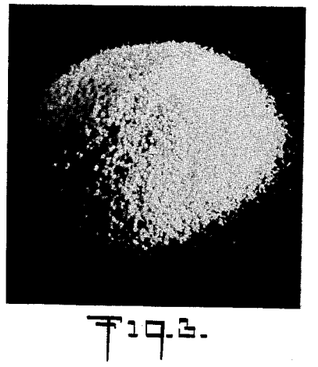
FIG. 3 is a photograph similar to FIG. 2 but showing a loose pile of unbaked fine sized cookie dough granules.

Example 1 is repeated, replacing the screens in the granulator to produce a loose mixture of fine, dry dough granules of through 16 mesh. FIG. 3 is a photograph of a sample of the resulting fine dough granules comprising a multiplicity of fine dough granules.

EXAMPLE 3

Figure 4:
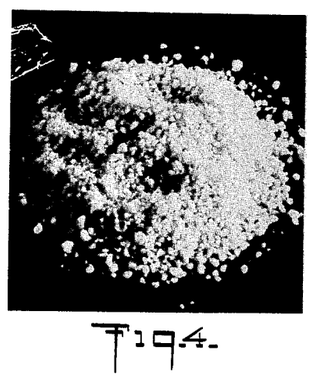
FIG. 4 is a photograph similar to FIG. 2, showing a loose pile of unbaked intermediate sized cookie dough granules.

Example 1 is repeated, replacing the screens in the granulator to produce a loose mixture of intermediate sized, dry dough granules of through 7 mesh and over 16 mesh. FIG. 4 is a photograph of a sample of the resulting dough granules comprising a multiplicity of intermediate sized dough granules.

EXAMPLE 4

Figure 5:
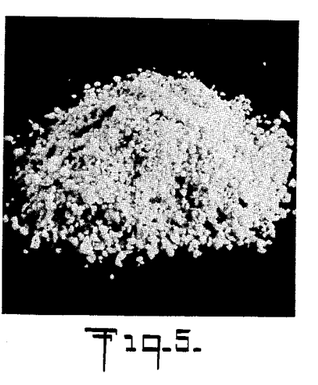
FIG. 5 is a photograph similar to FIG. 2 but showing a two-component baked cookie mixture comprising dough granules and nut granules.
Figure 6:
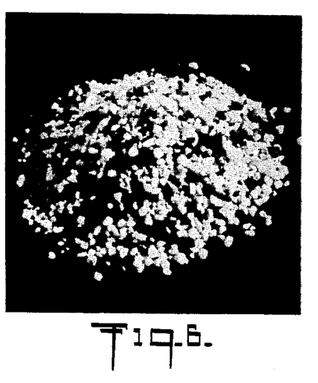
FIG. 6 is a photograph similar to FIG. 2 but showing three-component unbaked cookie mixture comprising granules of dough, nuts and chocolate.
Figure 7:
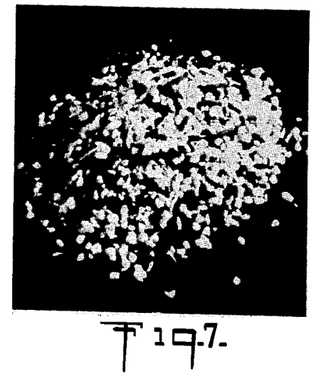
FIG. 7 is a photograph similar to FIG. 2 but showing a four-component unbaked cookie mixture comprising granules of dough, nuts, chocolate and coconut.

Various dough mixtures in granular form are prepared by intimately mixing the dough granules resulting from Example 3 with one or more of the following ingredients of approximately the same particle size: chocolate, nut, and coconut. FIGS. 5, 6 and 7 are photographs of the resulting mixtures, the proportions in each instance being given below, in Table I, in parts by weight. Shown in FIG. 5 are the dough granules intermixed with nut granules. In FIG. 6, chocolate granules are indicated mixed with the dough granules and the nut granules. FIG. 7 shows the dough, nut and chocolate granules intermixed with coconut granules.

*Table I*

| Ingredient | Fig. 5 | Fig. 6 | Fig. 7 |
|---|---|---|---|
| Dough granules | 100 | 100 | 100 |
| Nut granules | 25 | 12.5 | 8.3 |
| Chocolate granules | | 12.5 | 8.3 |
| Coconut granules | | | 8.3 |

EXAMPLE 5

Figure 8:
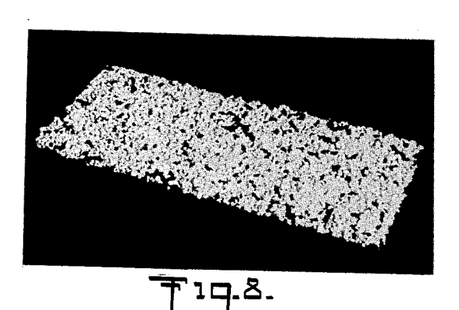
FIG. 8 is a photograph of the cookie mixture shown in FIG. 7, but disposed on a baking tray in preparation for baking.
Figure 9:
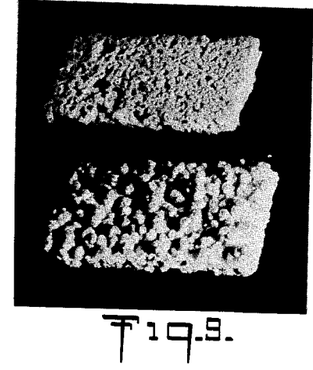
FIG. 9 is a photograph of the upper and lower surfaces of a baked cookie product made from the starting material shown in FIG. 4.
Figure 10:
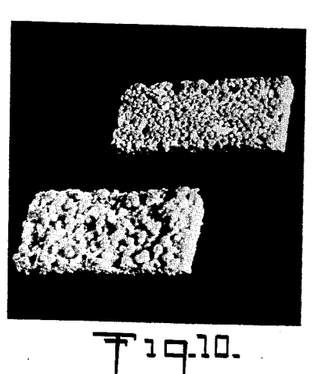
FIG. 10 is a photograph similar to FIG. 9, but made from the starting material shown in FIG. 5.
Figure 11:
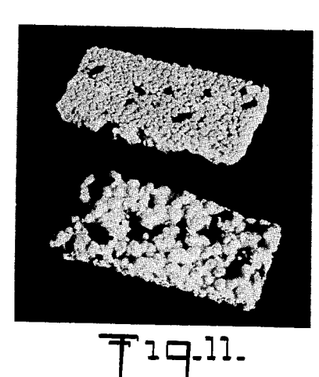
FIG. 11 is a photograph similar to FIG. 9, but made from the starting material shown in FIG. 6.
Figure 12:
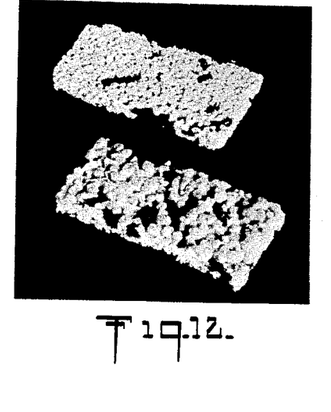
FIG. 12 is a photograph similar to FIG. 9, but made from the starting material shown in FIG. 7.

Each of the mixtures shown in FIGS. 4, 5, 6 and 7 is used as starting material for making cookies. Each starting material is deposited on a tray to a uniform bed depth and placed in an oven for baking. FIG. 8 is an illustrative photograph depicting a flat baking tray upon which has been deposited the mixture shown in FIG. 7. Baking is accomplished at a temperature of about 400° F. for a period of about 7 minutes. FIGS. 9, 10, 11 and 12 are photographs of the upper and lower surfaces of the resulting baked cookie product made from the starting materials shown in FIGS. 4, 5, 6 and 7, respectively. Note that the respective surface granules of dough, nut, chocolate and coconuts, respectively, are still identifiable in the fused or baked state.

EXAMPLE 6

Figure 13:
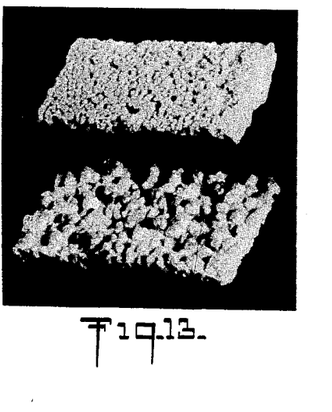
FIG. 13 is a photograph similar to FIG. 9, but made from the starting material shown in FIG. 2.

Example 5 is repeated using the dough granules shown in FIG. 2. The resulting baked piece is shown in FIG. 13. Note the tremendous cookie surface (crust) exposed to baking temperatures. More complete and extensive caramelization occurs with the increased surface area possible through the use of granular dough.

EXAMPLE 7

Figure 14:
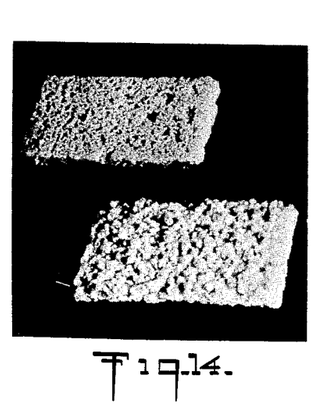
FIG. 14 is a photograph similar to FIG. 9, but made from the starting material shown in FIG. 3.
Figure 23:
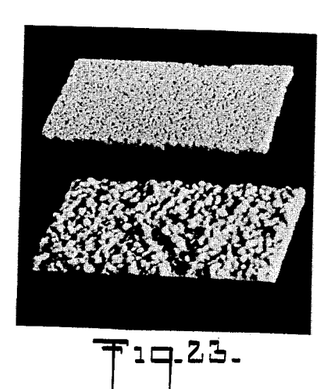
FIG. 23 is a wafer-thin cookie of the same granule composition as FIG. 14.

Example 5 is repeated using dough granules shown in FIG. 3. Resulting baked pieces are shown in FIGS. 14 and 23. FIG. 23 is a wafer-thin cookie of the same granule composition as FIG. 14.

EXAMPLES 8 AND 9

Example 5 is repeated using a dough having no shortening (Ex. 8) and a high shortening content (Ex. 9) in the following proportions.

| | Ex. 8 | Ex. 9 |
|---|---|---|
| Flour | 100 | 100 |
| Water | 14 | 8 |
| Sugar | 33 | 33 |
| Shortening | 0 | 25 |

Figure 15:
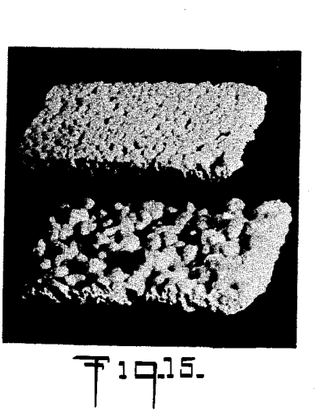
FIG. 15 is a photograph similar to FIG. 5, but made from a dough having no shortening.
Figure 16:
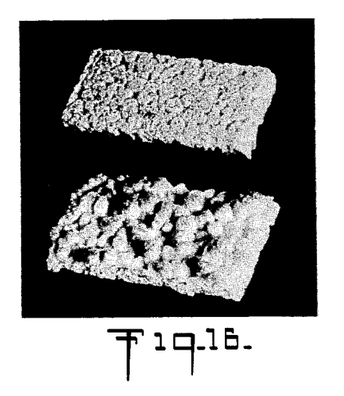
FIG. 16 is a photograph similar to FIG. 9, but made from a dough having a high shortening content.

FIGS. 15 and 16, respectively, are photographs of the baked products in Examples 8 and 9.

EXAMPLES 10 AND 11

Example 5 is repeated using a dough having a low sugar content (Ex. 10) and a high sugar content (Ex. 11) in the following proportions.

| | Ex. 10 | Ex. 11 |
|---|---|---|
| Flour | 100 | 100 |
| Water | 8 | 14 |
| Sugar | 17 | 67 |
| Shortening | 17 | 17 |

Figure 17:
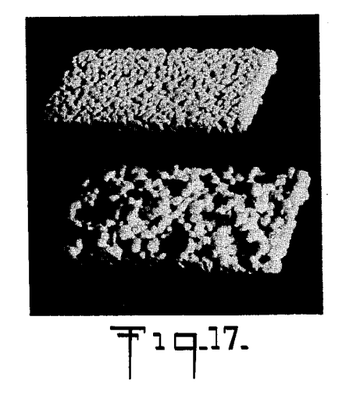
FIG. 17 is a photograph similar to FIG. 9, but made from a dough having low sugar content.
Figure 18:
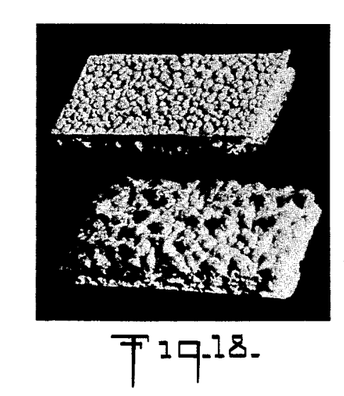
FIG. 18 is a photograph similar to FIG. 9, made from a dough having a high sugar content.

FIGS. 17 and 18, respectively, are photographs of the baked products in Examples 10 and 11.

EXAMPLE 12

Figure 19:
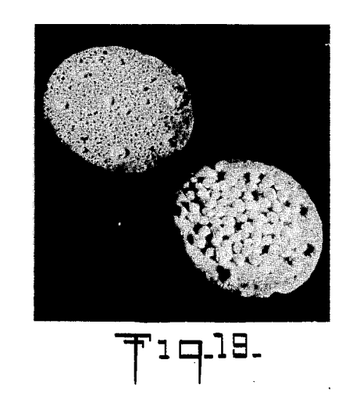
FIG. 19 is a photograph of a conventionally sheeted and cut cookie dough having lemon flavored and colored dough granules made in accordance with the invention with a decorative topping.

Example 5 is repeated using lemon flavored and colored dough granules as a decorative topping for a conventionally sheeted and cut cookie dough. FIG. 19 is a photograph of the baked product showing the lemon topping granules.

EXAMPLE 13

Figure 20:
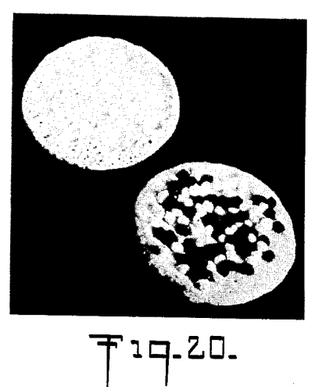
FIG. 20 is a photograph similar to FIG. 19 but using as the decorative topping a mixture of chocolate flavored and colored dough granules and lemon flavored and colored dough granules.

Example 12 is repeated using as a decorative topping, a mixture of chocolate flavored and colored dough granules and lemon flavored and colored dough granules. FIG. 20 is a photograph of the resulting product showing the lemon and chocolate topping granules.

EXAMPLE 14

Figure 21:
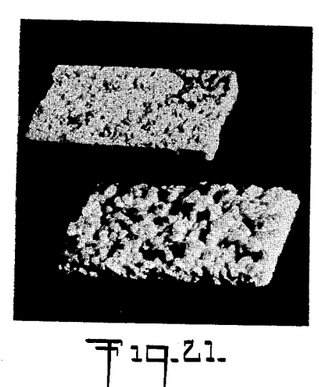
FIG. 21 is a photograph of a cookie made from a mixture of unflavored dough granules and apricot flavored and colored dough granules.

A cookie dough mixture is formulated by mixing 100 parts of the granules of Example 3 with 54 parts of dough granules of a similar size and composition but having an apricot coloring and flavoring additive. The cookie mixture is baked in the manner described in the previous examples. FIG. 21 is a photograph of the resulting baked product showing the individual granules of unflavored and apricot flavored dough.

EXAMPLE 15

Figure 22:
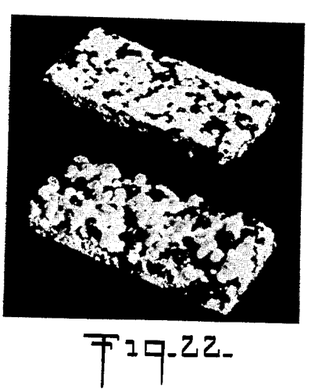
FIG. 22 is a photograph of a baked cookie made from a mixture of unflavored dough granules and blackberry flavored and colored dough granules.

Example 14 is repeated, substituting for the apricot additive a blackberry coloring and flavoring additive. FIG. 22 is a photograph of the baked cookie resulting therefrom.

EXAMPLE 16

A granular dough is made according to Example 3 and stored under refrigeration for a period of one month. At the end of the storage period, the granular dough is baked in accordance with the procedure described in Example 5. The resulting product is substantially similar in appearance and taste to the product shown in FIG. 9. The experiment is repeated using a granular dough which has been stored for one month at room temperature in a plastic bag. Substantially similar results are obtained. This experiment is repeated using a dough which has been stored under refrigeration for 6 months. A similar appearing and tasting product is obtained.

EXAMPLE 17

A dough batch for an animal food is prepared by mixing 100 parts flour with a cream mass comprising 33 parts sugar, 3 parts shortening, and 19 parts of water. Comminution of the dough is accomplished in a granulator—where the dough is comminuted and then it is suitably screened to form a loose mixture of dry dough granules of through 7 mesh and over 16 mesh size. The dough granules are deposited on a tray to a uniform depth and treated with a liquid spray. Baking is accomplished at a temperature of about 500° F. A highly satisfactory edible dog food is obtained.

EXAMPLE 18

A dough batch for bread is prepared by mixing 100 parts flour with a (fermented) cream mass comprising 24 parts sugar, 12 parts shortening, 14 parts water, and 8 parts of yeast, until a dry dough of proper consistency for granulating is formed. Comminution of the dough is accomplished in a granulator—where the dough is comminuted and then suitably screened to form a loose mixture of coarse dry dough granules of through 4 mesh and over 5 mesh size (U.S. Series). The dough granules are deposited on a tray to a uniform depth and treated with a water spray of such an amount to bring the flour absorption to 50%. The tray of treated granulse is proofed at 98% relative humidity and 98° F. for 3 hours. Baking is accomplished at a temperature of 400° F.

The invention is to be distinguished from the conventional baking technique where ingredients such as, for example, coconut, chocolate drops, nuts, etc., must be expertly incorporated in the dough during mixing in order for such ingredients to occur in the body of the baked piece without segregation and entrapment of air bubbles. An important advantage of the present invention, particularly in the continuous production of baked goods, is the ease with which minor ingredients such as those mentioned above may be varied by merely changing the proportions of the ingredients in the granule blending operation. Thus in the present invention it is entirely possible to use a single basic granulated dough in the production of a number of different varieties of baked goods. A basic dough made in accordance with the principles of the present invention is easily and readily produced, it is compatible with substantially all flavoring, coloring, and shortening ingredients and other additives, and may be combined with more and different ingredients in greater ranges of proportions in a more convenient and flexible manner than heretofore. The baked piece resulting from the blending of colored and uncolored dough granules may be multicolored throughout with little chance of the colors bleeding due to the distinct granule bounds. Another advantage of this invention is that cookie additive ingredients remain substantially a separate entity within the baked piece; such ingredients are not subjected to heavy working as may be the case when incorporated in conventionally mixed doughs. Still another advantage of this invention is that a high-sugar, no-shortening baked piece may be produced with a fine cellular structure derived from the constituent dough granules—conventionally, a wild, open grained, cookie would be expected.

From the foregoing description it will be seen that the present invention is a novel method of producing a food product, which insofar as appearance, taste, texture, eye appeal, and other properties are concerned, is entirely dissimilar to any known food product. As a cookie, with or without other ingredients, it reveals subtleties of flavor that are not obtained in conventionally made cookies. When the cookie ingredients are mixed in accordance with the invention there is always more certainty of perfection . . . of flavor created by controlled blending of the granular additives with the granular dough.

It will be understood that modifications and variations may be effected without departing from the spirit and scope of the invention.

We claim:
1. Process for producing cookies comprising forming a cream mass comprising sugar, shortening and water, incorporating the cream mass in flour in such proportions as to form a relatively dry dough, comminuting the dry dough into separate, non-adherent granules, depositing said granules on a supporting surface, depositing granules of other cookie ingredient on top of said supporting surface, and baking the granules to fuse said granules together said cookie ingredients being at least a member selected from the group consisting of nuts, chocolate, coconut, seeds, candies, candied fruit, gum drops, peels, flavoring agents, coloring agents, nutritional agents and combinations thereof.
2. Process according to claim 1, wherein deposition of said dough granules and said granules of other cookie ingredients is carried out simultaneously.
3. Process for producing cookies comprising forming a cream mass comprising sugar, shortening and water, incorporating the cream mass in flour in such proportions as to form a relatively dry dough, comminuting the dry dough into separate, non-adherent granules, sizing said granules through a sieve, depositing said granules on a supporting surface, liquid treating the deposited granules, and baking the deposited granules to fuse said granules together.
4. The continuous process for the preparation of baked foods having a plurality of dough granules, in a pebble-like appearance which comprises the steps of:
 (a) continuously mixing sugar, shortening and water to form a cream mass,
 (b) continuously adding flour in such a proportion that the water ratio of said resulting dough is reduced substantially to form a dry dough,
 (c) continuously comminuting said dough to a plurality of granules,
 (d) continuously depositing said granules on a support, to form a deposit of granules of said dough,
 (e) continuously subjecting said deposit to treatment with fluids which are compatible with said dough,
 (f) baking said deposit and cutting said baked food according to preselected shape and size.
5. The continuous process according to claim 4, wherein at least one additive which is a member selected from the group consisting of nuts, chocolate, coconut, meat, tomato pumice, meat meal, and combinations thereof, is mixed with said dough granules at a predetermined rate and in predetermined amount and said mix is deposited to form a continuous bed prior to baking.

References Cited by the Examiner

UNITED STATES PATENTS

| | | | |
|---|---|---|---|
| 554,273 | 2/96 | Hueg | 107—4 |
| 2,092,160 | 9/37 | Hawerlander | 99—86 |
| 2,298,278 | 10/42 | Clark | 99—86 |
| 2,632,707 | 3/53 | Battiste | 99—94 |
| 2,669,924 | 2/54 | Wiemer | 99—2 |
| 2,672,422 | 3/54 | Patterson | 99—94 |
| 2,738,277 | 3/56 | Cryns | 99—83 |
| 2,856,287 | 10/58 | Forkner | 99—94 |
| 2,874,053 | 2/59 | Mills | 99—94 |
| 2,956,519 | 10/60 | Angell | 107—4 |
| 2,975,059 | 3/61 | Andrews | 99—94 |
| 2,995,773 | 8/61 | Gidlow et al. | 99—94 |
| 2,998,318 | 8/61 | Forkner | 99—86 |
| 3,024,112 | 3/62 | Burgess | 99—2 |
| 3,057,730 | 10/62 | Morck | 99—86 |

FOREIGN PATENTS

| | | |
|---|---|---|
| 1,747 | 1896 | Great Britain. |
| 647,894 | 12/50 | Great Britain. |

A. LOUIS MONACELL, *Primary Examiner.*

TOBIAS E. LEVOW, ABRAHAM H. WINKELSTEIN, RAYMOND N. JONES, *Examiners.*